US010888760B1

(12) United States Patent
Cady

(10) Patent No.: US 10,888,760 B1
(45) Date of Patent: Jan. 12, 2021

(54) REMOTELY CONTROLLED TOURNAMENT STEER

(71) Applicant: Jason P. G. Cady, Morristown, AZ (US)

(72) Inventor: Jason P. G. Cady, Morristown, AZ (US)

(*) Notice: Subject to any disclaimer, the term of this patent is extended or adjusted under 35 U.S.C. 154(b) by 0 days.

(21) Appl. No.: 16/732,572

(22) Filed: Jan. 2, 2020

(51) Int. Cl.
| A63B 69/00 | (2006.01) |
| A63B 71/06 | (2006.01) |
| G09B 19/00 | (2006.01) |
| A01K 15/00 | (2006.01) |
| A01K 15/02 | (2006.01) |
| G09B 9/00 | (2006.01) |

(52) U.S. Cl.
CPC ...... *A63B 69/0068* (2013.01); *A63B 71/0686* (2013.01); *A01K 15/00* (2013.01); *A01K 15/003* (2013.01); *A01K 15/02* (2013.01); *A63B 69/00* (2013.01); *A63B 2225/09* (2013.01); *G09B 9/00* (2013.01); *G09B 19/0038* (2013.01)

(58) Field of Classification Search
CPC . A63B 69/0068; A63B 69/00; A63B 2225/09; G09B 19/0038; G09B 9/00; A01K 15/00; A01K 15/02; A01K 15/003
USPC .......... 434/225; 273/339, 359, 336; 119/839
See application file for complete search history.

(56) References Cited

U.S. PATENT DOCUMENTS

| 4,960,076 | A | * | 10/1990 | Snorgrass | ............ | A01K 15/027 |
| | | | | | | 119/839 |
| 4,981,302 | A | * | 1/1991 | Narramore | ......... | A63B 69/0068 |
| | | | | | | 273/339 |
| 5,568,926 | A | * | 10/1996 | Kaptein | ............. | A63B 69/0068 |
| | | | | | | 273/359 |
| 7,293,775 | B1 | * | 11/2007 | Donnelly | ............. | A01K 15/003 |
| | | | | | | 119/839 |
| 2014/0193785 | A1 | | 7/2014 | McCarthy | | |
| 2016/0029596 | A1 | | 2/2016 | Bruegman et al. | | |
| 2017/0197133 | A1 | * | 7/2017 | Rogers | ............... | A63B 69/0068 |
| 2017/0270819 | A1 | | 9/2017 | Stephens | | |

FOREIGN PATENT DOCUMENTS

CA    2313594 A1 *  1/2002  ........... A63B 26/003

OTHER PUBLICATIONS

Roping Rules (see attached 2016rules.pdf).
Electronic Sports Timing Polaris Timer Console (see attached ElectronicSportsTiming.pdf).
Team Roping Software Features—Roping Assistant Professional 6.0 (see attached TeamRopingSoftwareFeatures.pdf).
United States Team Roping Championships (see attached USTRCRulebook.pdf).

* cited by examiner

*Primary Examiner* — Benjamin Layno
(74) *Attorney, Agent, or Firm* — Mark V. Loen

(57) ABSTRACT

The present invention is a motor driven tournament steer that comprises a front frame and a back frame. The front frame incorporates a steer head with protruding horns suitable for roping. The rear frame incorporates roping 'legs' and is hinged to the front frame. When two ropers catch the steer head and 'legs', the heeler roper lifts the rear frame, a switch is activated, and the motor stops. A timer simultaneously stops. The motor is started by a remote controlled switch.

4 Claims, 5 Drawing Sheets

REMOTELY CONTROLLED TOURNAMENT STEER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed toward mechanical roping steers, in which teams of two ropers coordinate to achieve the lowest roping time in a tournament setting. A small design is used for simulation of roping a calf where the players can compete for roping time utilizing methods that safely capture a wayward calf.

(2) Description of Related Art

Team roping a steer is a rodeo event that features a live steer and two ropers on horses, a "header" and a "heeler." The healer ropes the front of the steer, usually around the horns or head. Once the head/horns are roped, the header wraps his rope around the saddle horn (dallies) and uses his/her horse to turn the steer to the left. The heeler ropes the steer by its hind feet after the header has turned the steer. The heeler also dallies, and the header turns his/her horse to directly face the steer and heeler. Both horses back up slightly to stretch out the steer's hind legs and immobilize the animal. A flagger raises a flag and the roping time is recorded.

A similar team sport is to rope a calf instead.

Rodeos are expensive and complicated to host. There is a great deal of infrastructure and effort needed to care for steer and horses. Also, there is a burden on contestants to use trucks/trailers and bring them to the rodeo. Some events require contestants to bring along suitable steers. Consequently, putting on a rodeo of this magnitude is expensive.

There is a need in the marketplace for a smaller, portable, electronic roping tournament steer that moves independently and is designed to mimic a properly roped steer by a team of two players. Also, there is a need to provide a suitable tournament environment that avoid disputes between parties when equipment lacks accuracy and repeatability. Disputes among competitors lower motivation to participate in contests, as the need to win or lose fairly is an important basis for a successful tournament environment.

To address this need, it is important that a roping tournament is down sized to fit inside a dance floor, small arena, or parking lot. There is a long felt need in the art for small venue competition where ropers can compete on a local level for fun or prize money. Competitions can then be held in a wide variety of places at an affordable host site and avoid the infra structure needed for live animals. A small sized electro-mechanical calf with electronic timing, reduces the overhead cost and complexity. Competitors only must arrive with a rope and a desire to compete.

Others have created a fixed position dummy steers for practicing purposes. And others have made dummy steers mobile, also for practicing purposes.

An example is US 20140193785 which discloses a roping dummy apparatus. This stationary dummy is suitable for practicing throwing a rope onto to a stable, non movable frame. However, it is not suitable for use in advanced practicing as it is immobile.

Another example is US 20160029596 which discloses a moving dummy that also has legs that simulate the natural motion of an animal. However, it has disadvantages for use in a tournament. A towing vehicle is needed to move the articulating steer, and there are no features for a competitive tournament play. There is no timer, nor is there an ability to precisely measure the timing of catching the rear legs. US20170270819A1 has similar disadvantages for use in tournament play.

Many of the current dummy steers used for roping practice are bulky, overly heavy, and are unsuitable for smaller roping venues. They require a vehicle for moving and positioning. Some require cables, pulleys, or manpower to create motion. In tournament play, the need for a consistent speed between player turns is important.

BRIEF SUMMARY OF THE INVENTION

The present invention is a motor driven tournament steer that comprises a front frame and a back frame. The front frame incorporates a decorative steer head with protruding horns suitable for roping. The front frame incorporates three wheels, two of which are driven by a remotely controlled motor. A third, smaller rear wheel provides stability for motion over rough terrain. The rear frame is hinged to the front frame, and the rear frame includes legs that can be roped. During tournament play, a roper lifts the rear frame which activates a switch that stops the steer and a timer. The steer motor is started by a remote control, and the timer is started by a photo switch at the tournament steer gate.

A team of two start their roping turn when the tournament steer passes through the photo switch. The steer then runs into a small flat arena and the team members rope the head and legs.

BRIEF DESCRIPTION OF THE SEVERAL VIEWS OF THE DRAWING(S)

DETAILED DESCRIPTION OF THE INVENTION

Figure 1A:
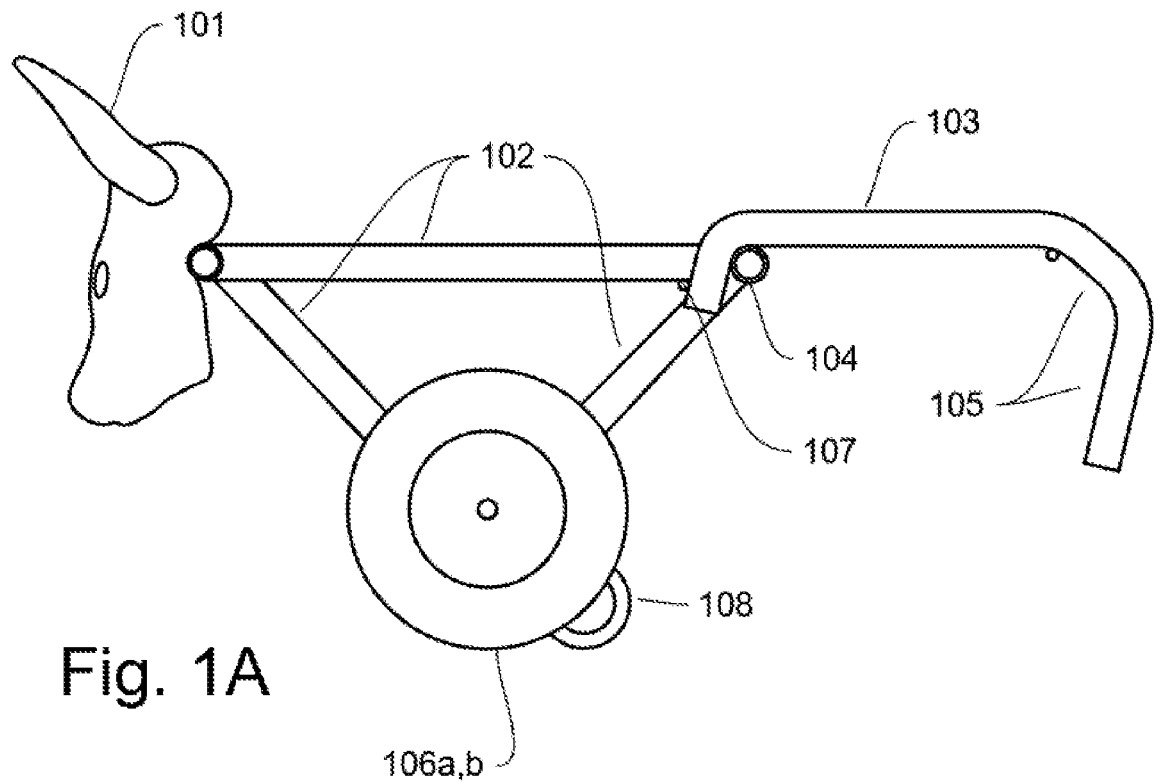
FIGS. 1A-1B are side views of an electronic tournament steer.
Figure 1B:
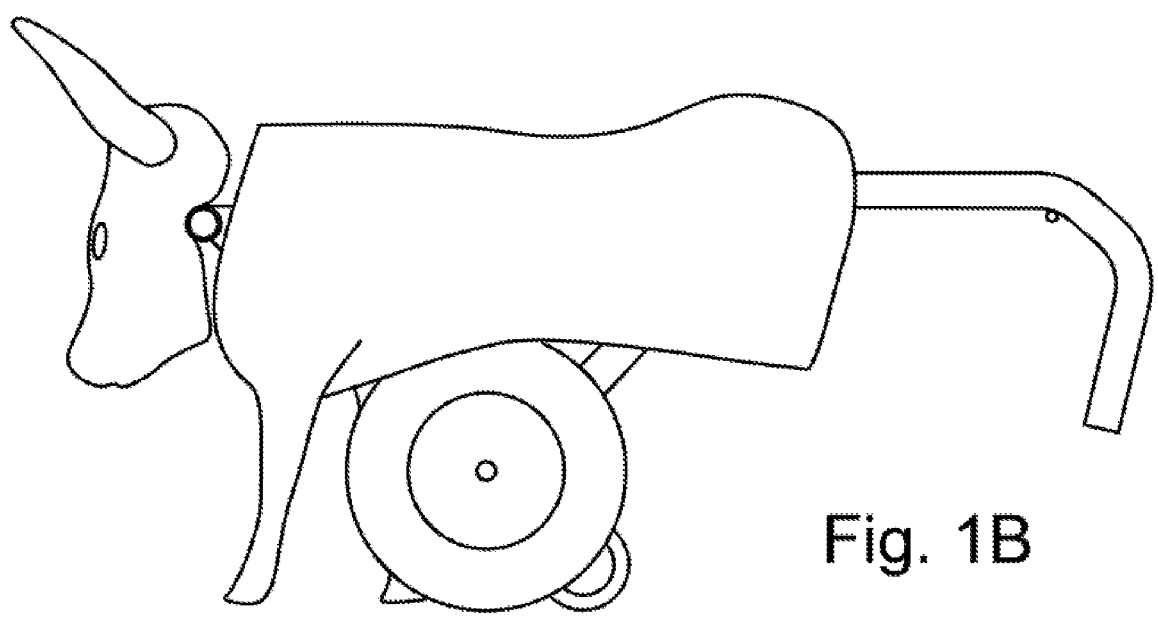
Figure 2:
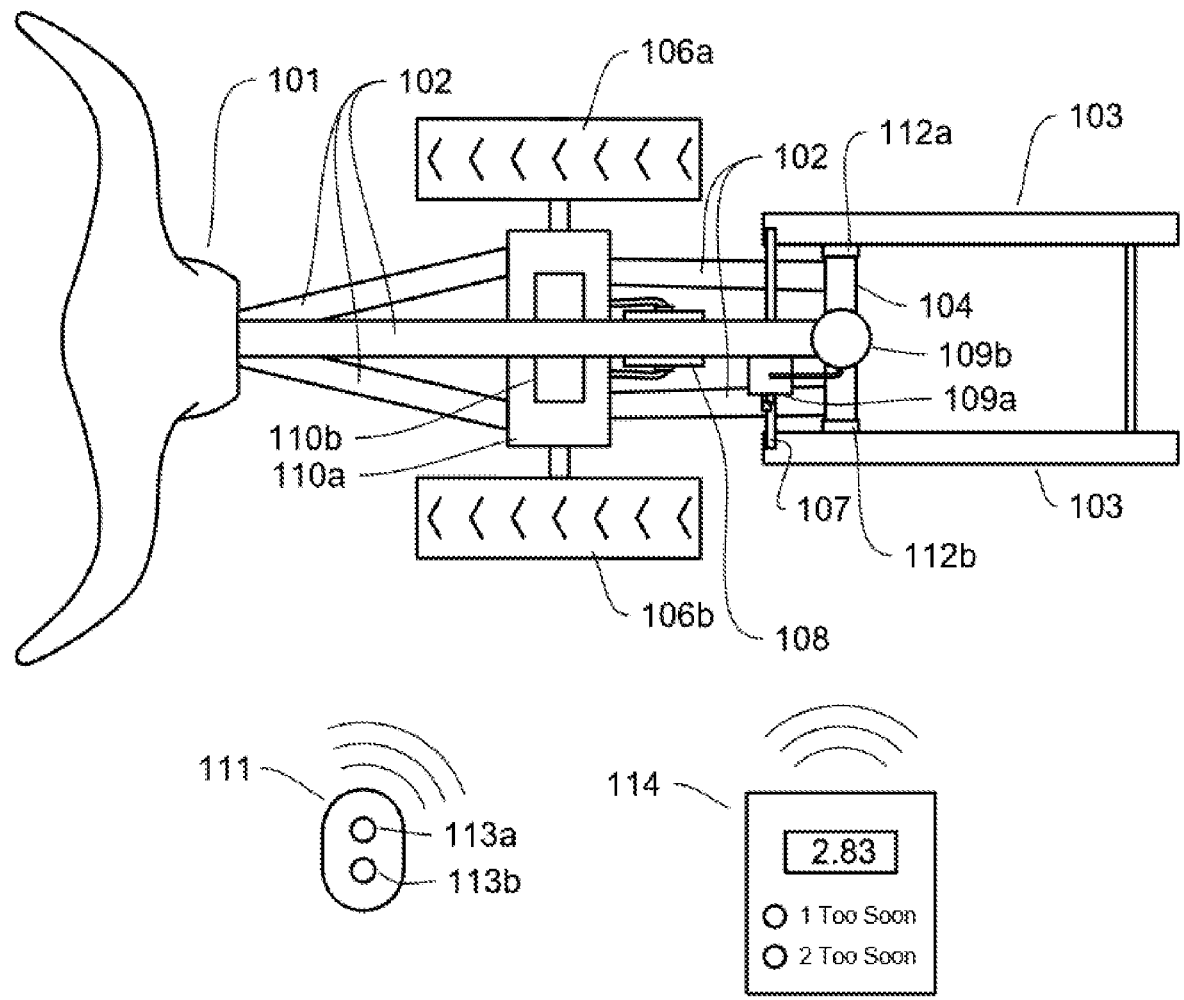
FIG. 2 is a top view of the electronic tournament steer.

FIGS. 1A-3B show the following items:
101 Decorative head with protruding horns
102 Front Frame tubing
103 Back Frame that lifts upwardly with respect to front frame
104 Pivot Hinge
105 Back leg tubing sections of rear frame
106a,b Motor Powered Tires
107 Rear Frame Structural Member
108 Rear Stabilizing Tire 109a Timer Switch and 109b Wireless Transmitter
110a Box enclosing a DC Motor, Gearing, and Battery
110b Motor Controller or optionally speed rheostat (wireless)
111 Remote Motor Control Button
112a,b Bushings for hinge
113a,b on/off motor switch
114 Judges Wireless Timer Controller
120 Timer Switch Connecting Wiring
301a,b Header Roper Photo Switch (wireless)—Sensor and Transmitter
302a,b Photo Switch for Tournament Steer (wireless)—Sensor and Transmitter
303a,b Heeler Roper Photo Switch (wireless)—Sensor and Transmitter
304 Leg Rope
305 Head Rope In FIG. 1A, the decorative head 101 incorporates a pair of protruding horns that simulate the horns of a calf or a small steer. The horns are rigidly attached to the front frame to give the impression of a small steer head. The horns are the target for header roping. FIG. 1B shows an optional steer body that convers the front frame and part of the rear frame.

The front frame 102 is hinged to the rear frame 103 as shown. A hinge 104 allows the rear frame to be upwardly lifted with respect to the front frame. Additionally, the rear frame has vertically oriented back leg tubing sections 105 as part of rear frame that provide a rear roping target for the heeler.

When the back leg tubing sections (roping legs) are successfully roped, and the heeler lifts up the rope, the rear frame lifts, and an end timer switch 109a is triggered. The end timer switch is directly wired to the steer motor 110a (not shown) to turn it off. This is done by interrupting power to the motor controller (which controls the motor) to stop the steer motion. Other types of common motor stopping methods are equally deployed.

Two inline wheels 106a,b are connected to the motor, and a rechargeable battery underneath the motor (not shown) provides power. A rear wheel 108 just behind the two inline wheels, provides important horizontal stability to the electronic steer motion. At least one rear stabilizing wheel is needed. The tournament steer is heavy, and difficult for a header or a heeler to tip the steer.

Additionally, a remote control 111 is used to stop the motor, and thus the electronic steer motion. The remote motor control preferably has two buttons 113a,b for start and stop. The start button is used to start the tournament steer for a turn, which passes through a steer electronic photo switch which starts the timer. The remote motor control button is not used for tournament timing. A stop button is needed in case the roping team does not successfully rope the mechanical steer, and the mechanical steer begins to run out of the designated tournament space.

The wireless timer switch 109a has a resolution of least 0.01 seconds, and wirelessly transmits 109b activation to the wireless timer controller 114. (See FIG. 4 for additional details). It is preferably mounted near the hinge 104 on the front frame but could equally be mounted on the rear frame. When the roping time is taken, a judge calls out the time for everyone to hear. A typical roping time is 2.5 to 5 seconds when there is no time penalty.

During play, the front head of the steer is roped 305 by the header, the rear 'legs' are roped 304 by the heeler, and the roping time is stopped when the back legs are lifted. The roping time is recorded for each team, and the winner is judged based on time for a single roping time, or multiple times. The average or shortest time may be used, depending upon tournament rules.

Figure 4:
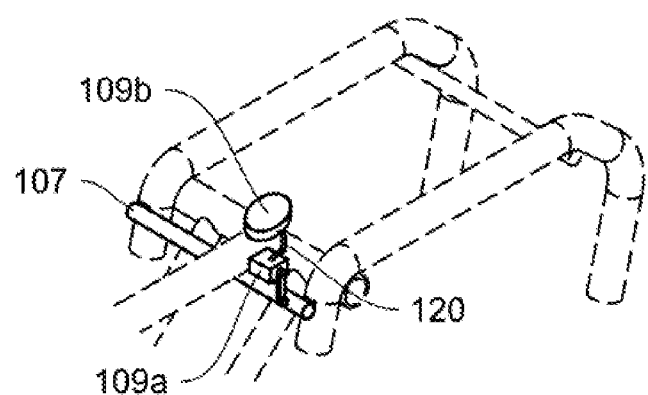
FIG. 4 shows details of the end timer switch.

FIG. 4 shows additional details of the end timer switch 109a that is wired 120 to a remote wireless transmitter 109b. A rear frame bar 107 is used to activate the end timer switch 109a. When the heeler ropes the rear frame and lifts up, the end timer switch then activates.

Various rules on what constitutes a successful header or heeler catch are adapted to encourage contestants to practice methods that safely capture a calf. Typical rules for a successful header catch are to rope both horns without a FIG. 8, and the heeler must rope both legs. Also, the heeler cannot attempt a catch until the header has a successful catch and pulls on the rope to make the tournament steer change direction, usually to the left. Turning the steer also gives the heeler a better orientation to successfully catch both rear legs.

During play, there are time penalties when either player leaves their start position too soon (activates their photo switch) or does not properly catch the tournament steer. Typical penalties can be five seconds, or a 'no time' call for infractions.

To improve the challenge for the contestants, the tournament steer moves faster than walking speed, typically about five miles per hour, so that the contestants are at least jogging when chasing the tournament steer.

Figure 3A:
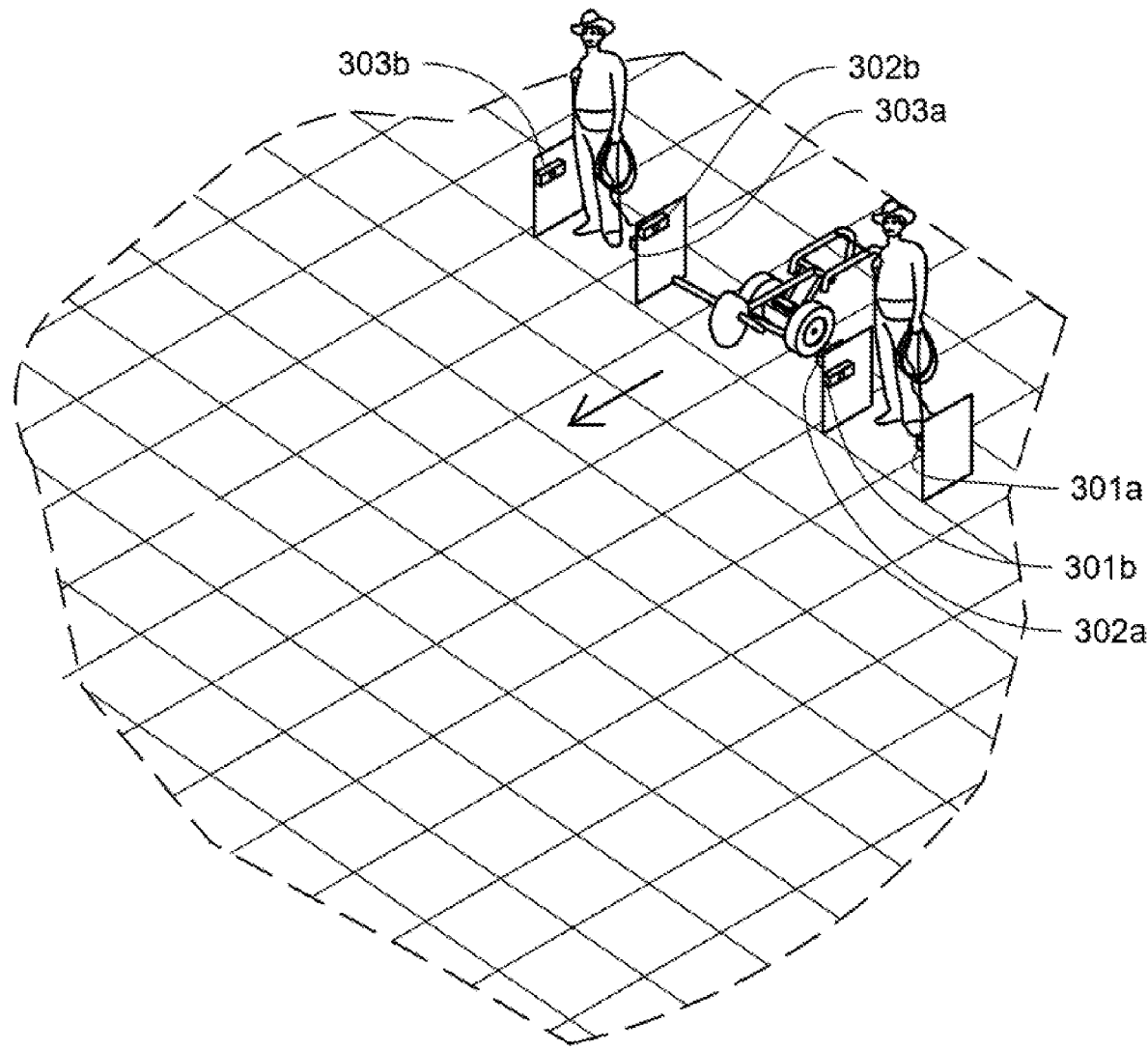
FIGS. 3A-3B are views of tournament play.
Figure 3B:
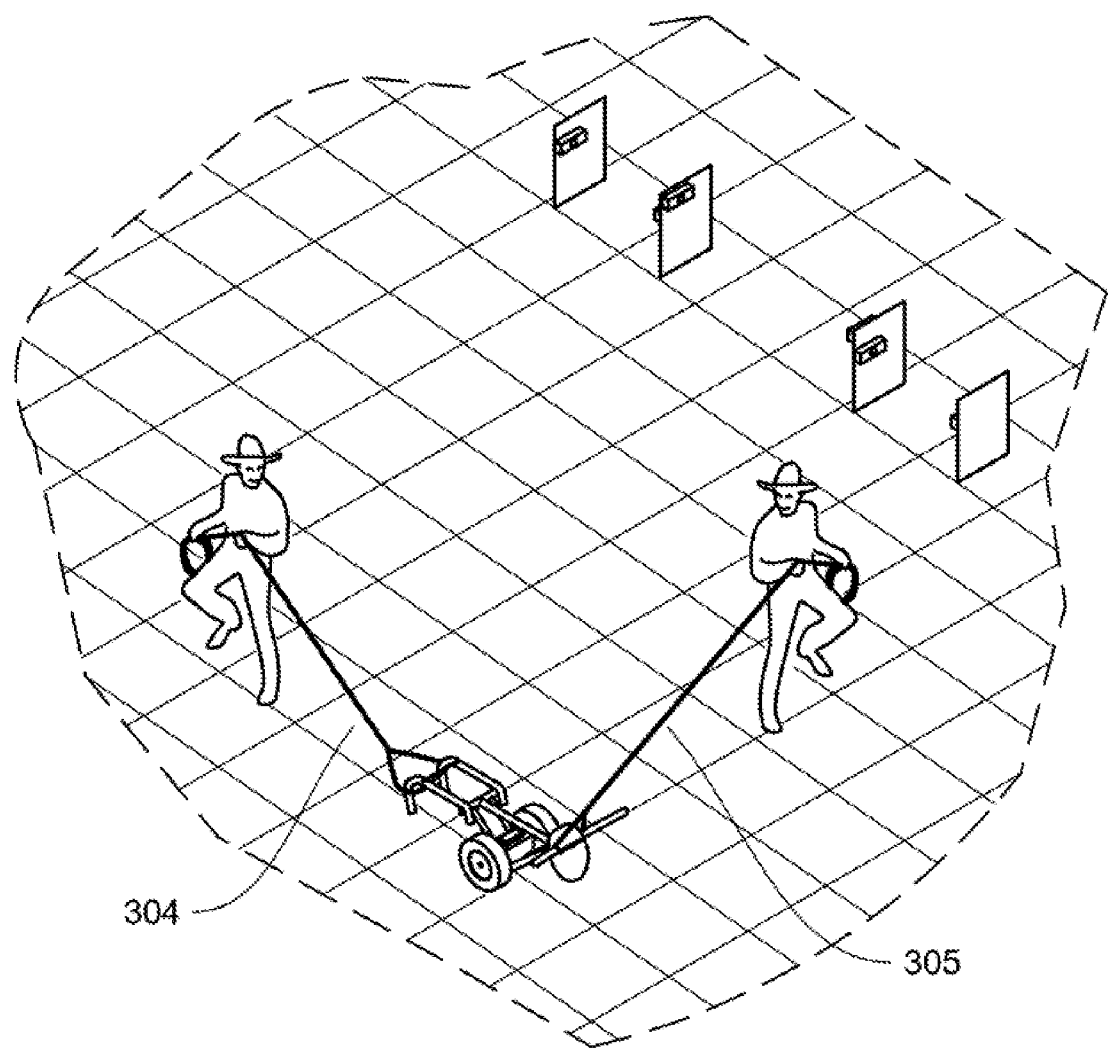

The overall design provides a tournament steer that is capable of:
1. being suitable for roping practice and for tournament games
2. being portable and easy for one or two people to lift out of a pickup truck
3. being able to run on flat terrain that is rough, such as a dirt parking lot
4. being fast enough to be challenging for ropers/contestants
5. trains ropers in the proper methods of securing a calf successfully and without harm
6. having a sufficient battery charge to last at least two hours of tournament play
7. being rugged enough to take the kind of abuse that occurs during tournament play
8. being heavy enough so that the header or heeler cannot tip the tournament calf over
9. being stopped by a remote control to provide roper and spectator safety
10. is safe to use with minimal risk of injury to ropers/spectators
11. stopping quickly when roped so that it will not incur sudden or unexpected movement The tournament rules and setup provide a skill challenging environment. As seen in FIGS. 3A-3B, a typical contest comprises:
1. A team of two players (header and heeler) participates in turn. The team takes their starting positions next to the steer. As illustrated, the header is on the right, and the heeler is on the left.
2. The roping turn starts when the steer is activated by remote control and passes through a start photo switch 302a,b which starts the roping time in the timer controller 114. The players watch the tournament steer and judge when it has passed through the start photo switch to begin their chase. The timer controller 114 monitors the start photo switch by use of wireless communication.
3. The header and heeler then run from their starting position and attempt to successfully rope the tournament steer. Remote photo switches 301a,b 303a,b activate when they pass through the sensor beam. If either the header or heeler activate a photo switch too soon (before the start photo switch activates), the timer controller 114 displays a 'too soon' LED light and a time penalty is charged. A typical time penalty is 5 seconds.

4. As seen in FIG. 3B, the header ropes 305 the horns and pulls enough rope tension to cause the tournament steer direction to turn to the left. The heeler cannot rope until this step is completed. A judge watches this and will disqualify the time if the heeler ropes too soon.

5. The heeler ropes 304 the rear 'leg' frame and lifts the rear frame upwardly so that the end timer switch is activated. This stops the timer and shuts off power to the steer motor. The end timer activation is wirelessly sent to the timer controller 114 which computes and displays the time.

6. The time is recorded and called out for all to hear. Any time penalty is also called out.

7. The tournament manager has a remote stop switch 111 to stop the steer if the rear legs are not successfully captured.

The timer controller 114 includes timer logic for the four remote switches (start timer switch, end timer switch, header moving switch, and heeler moving switch). The timer controller provides confidence that any starting fault, starting time, or rear leg lift time is fairly recorded between competitors, and is free of the use of a handheld stopwatch.

The timer controller 114 includes a central processing unit, volatile and non-volatile memory, a software operating system, programming logic particular to the tournament, wireless communications, connection to a power supply, and buttons useful for setting up and operating the timer controller. It also includes a display indicating various operating functions, preferably by a combination of LED lights and text display.

Although wireless communication between the remote switches and the timer controller is preferred, wired connections could be equally employed. However, it is not preferred that the tournament steer end timer switch is hard wired to the timer controller. Any wire that trails behind the steer would be dragged into the chase area, and likely to be a tripping hazard or become damaged.

When operating a tournament, a tournament manager-judge is the only staff person that is needed. All the duties of running a tournament are simplified by the automation, remote timing, and remote activation of the equipment.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A remote controlled tournament steer and timing elements comprising:
    A) a front frame and a rear frame,
    B) said front frame further comprises:
        a) front structural elements,
        b) a front roping target with horns,
        c) a remotely controlled motor connected to two inline wheels,
        d) at least one rear idler wheel, and
        e) an end timer switch connected to an end time wireless transmitter,
    C) said rear frame further comprises;
        a) rear structural elements,
        b) two roping elements positioned and oriented for roping, and
        c) a structural member positioned to activate said end timer switch,
    D) said front frame and said rear frame are connected by a hinge having a rotating axis,
    E) said rear frame rotates about said rotating axis,
    F) wherein said remotely controlled motor is configured to stop when said end timer switch is activated,
    G) a remote control configured to activate said remotely controlled motor,
    H) a timer controller that is configured to:
        a) receive communication from a steer start photo switch,
        b) receive communication from said end time wireless transmitter,
        c) compute a roping time, and
        d) display said roping time.

2. The remote controlled tournament steer according to claim 1 further comprising:
    A) a header photo switch that communicates with said timer controller,
    B) a heeler photo switch that communicates with said timer controller,
    C) said timer controller is configured to display an activation of either
        a) said header photo switch or
        b) said heeler photo switch
        if activated prior to said steer start photo switch.

3. A roping turn for a remote controlled tournament steer and timing elements comprising:
    A) providing:
        a) a front frame and a rear frame,
        b) said front frame further comprises:
            i) front structural elements,
            ii) a front roping target with horns,
            iii) a remotely controlled motor connected to two inline wheels,
            iv) at least one rear idler wheel, and
            v) an end timer switch connected to an end time wireless transmitter,
        c) said rear frame further comprises;
            i) rear structural elements,
            ii) two roping elements positioned and oriented for roping, and
            iii) a structural member positioned to activate said end timer switch,
        d) said front frame and said rear frame are connected by a hinge having a rotating axis,
        e) said rear frame rotates about said rotating axis,
        f) wherein said remotely controlled motor is configured to stop when said end timer switch is activated,
        g) a timer controller that is configured to:
            i) receive communication from a steer start photo switch,
            ii) receive communication from said end time wireless transmitter,
            iii) compute a roping time, and
            iv) display said roping time,
    B) utilizing a remote control configured to activate said remotely controlled motor, and
    C) whereby said roping turn for a team of two competitors begins.

4. The remote controlled tournament steer according to claim 3 further comprising:
    A) a header photo switch that communicates with said timer controller,
    B) a heeler photo switch that communicates with said timer controller, C) said timer controller is configured to display an activation by either
   a) said header photo switch or
   b) said heeler photo switch
   if activated prior to said steer start photo switch.

* * * * *